Patented June 19, 1923.

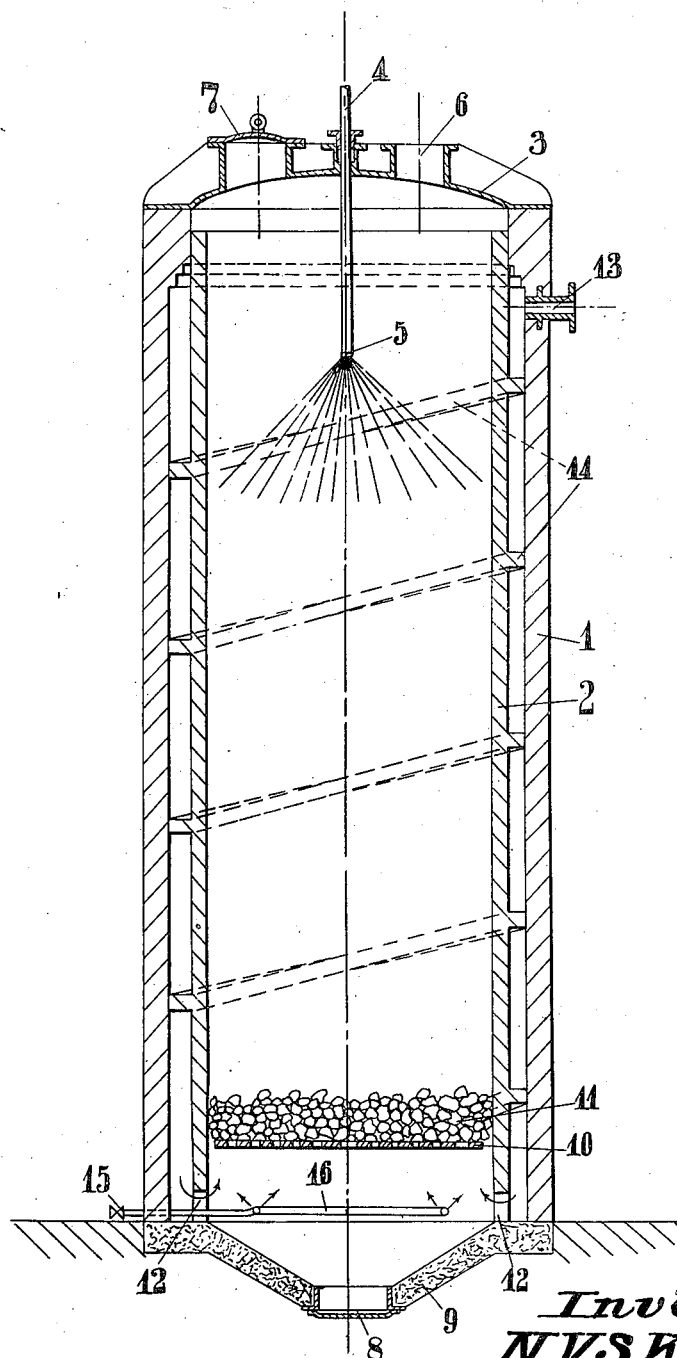

1,459,156

UNITED STATES PATENT OFFICE.

NORMAN VICTOR SYDNEY KNIBBS, OF LONDON, ENGLAND.

DISTILLATION AND CRACKING OF MINERAL OILS AND OTHER HYDROCARBON-CONTAINING MATERIAL.

Application filed October 5, 1920. Serial No. 414,837.

*To all whom it may concern:*

Be it known that I, NORMAN VICTOR SYDNEY KNIBBS, a subject of the King of Great Britain and Ireland, and residing at 810 and 811 Salisbury House, London, E. C. 4, England, have invented certain new and useful Improvements in and Relating to the Distillation and Cracking of Mineral Oils and Other Hydrocarbon-Containing Material, of which the following is a specification.

This invention relates to the distillation and cracking of mineral oils and other hydrocarbon containing materials.

In the more usual processes of cracking and distilling the oil is heated in a closed apparatus by the combustion of fuel, and the heat has to be transmitted through the walls of the vessel. The carbon which separates out tends to form a coat on the inside of the vessel and thus to increase the resistance of the walls to heat transmission. It may also weaken the walls if they are made of iron or steel, and in any case means must be employed to remove the deposited carbon from the cracking tubes or chambers.

It has however, been proposed to carry out the cracking or distillation of mineral oils and other hydrocarbon-containing materials under conditions in which the heat necessary is not transmitted through the walls of the treatment vessel but is directly applied to the materials by bringing them into direct contact with combustion gases within a chamber which is not provided with packing and therefore permits the unobstructed passage of the material through the chamber. It has further been proposed in order to crack or distill mineral oils and other hydrocarbon-containing materials to cause them to descend through a mass of coke within a chamber, at a point near the base of which air or a mixture of steam and air is introduced in order to effect combustion of the carbon and it has been stated that in certain cases the combustion of the residual material will provide sufficient heat and it will therefore be unnecessary to introduce further quantities of coke into the chamber. In connection with the process last referred to it is stated to be essential that the oil or hydrocarbon-containing material and carbon in the form of coke should be present in at least equal proportion by weight.

According to the present invention, the material to be distilled or cracked is caused to descend, preferably in a finely divided state, through a chamber which contains no coke or other packing which would impede the passage of the material under treatment, in direct contact with a current of hot gas produced by the combustion of the less volatile residues obtained in the treatment of the material.

The combustion of the less volatile residues may be effected by the admission to the chamber in which the material is treated at an appropriate point, of air or a mixture of air and steam or water. Ordinarily the material to be treated and the hot gas are caused to travel in opposite directions through the treatment chamber.

In carrying the invention into effect the material as, for instance, petroleum may be introduced in the form of a spray or in any other suitable way in order to cause the material to expose a considerable surface to the heated gases at some suitable point, as for instance, at or near the top of the treatment chamber, which may be a vertical metal cylinder lined or partly lined with refractory material but which contains no packing of coke or other material which would impede the passage of the petroleum or other material under treatment; while air optionally mixed with water or steam is introduced at a lower level, the current of air being preferably suitably broken up as by causing it to pass through a layer of refractory material.

At the beginning of the operation, the refractory material is heated to a suitable temperature in any suitable manner.

The heating of the refractory material may, for instance, be effected by introducing into the chamber a limited supply of oil and a quantity of air sufficient to effect the complete combustion of the oil on the refractory material, the ratio of oil to air being increased when the refractory material has been raised to a suitable temperature. The oil in its descent through the chamber meeting with the heated combustion gases will become progressively poorer in volatile constitutents until finally only a residue of carbon or pitch or oily residue may reach the bottom of the chamber where it will be burnt by the air admitted, the combustion of this residue supplying the heat required for the distillation and cracking of the oil under treatment. The chamber may in these circumstances be regarded as comprising two zones, in the upper of which distillation and cracking takes place while in the lower the combustion of the residuals is effected.

The gases and vapours arising in the process are led from the treatment chamber to suitable treatment apparatus to effect the separation of the liquid and gaseous products, suitable baffles being, if necessary, provided to prevent the liquid material treated being carried over.

The cracking process may be carried out at any temperature sufficient to effect the desired result, the regulation of the temperature being effected by controlling the combustion of the residual material.

The temperature may also be regulated by the admission of steam or water in varying proportions.

Steam or water may also be admitted for the purpose of providing hydrogen for influencing the desired reactions, or for otherwise influencing the cracking operation or the character of the products obtained.

The cracking process may be carried out at any desired pressure.

The uncondensed gases formed in the process by the cracking operation and by the combustion of the residual material may be employed for lighting, heating, or power or other purposes, the olefines, di-olefines and other hydrocarbon contained therein being, for instance, used in the synthesis of commercially useful chemical products.

The following particulars are given by way of example for the purpose of illustrating a suitable manner of carrying the invention into effect and reference will be made in this connection to the accompanying drawing in which one form of apparatus which may be used is illustrated.

In the drawing, 1 is an outer shell constructed of metal and being adapted to withstand the working pressures, 2 is an inner steel shell, the internal and external pressures on which will be balanced, 3 is a cover plate through which passes the oil admission pipe 4 provided with a spraying nozzle 5.

The cover plate is also provided with an outlet 6 for the gases and vapours produced and a manhole 7 for facilitating access to the chamber for inspection, cleaning and so forth, a manhole 8 being also provided in the bottom plate 9. Within the inner shell, a grid 10 is arranged, on which a layer 11 of refractory material may be supported and holes 12 are provided in the inner shell below this plate for admitting thereto air introduced by way of the pipe 13 to the space between the inner and outer shell through which it is caused to pass in a helical course by means of the baffle 14. A pipe 15 is provided in the construction illustrated terminating in a perforated coil 16 by means of which steam may be introduced into the device.

When employing the apparatus above described, the oil to be treated will be introduced into the inner shell 2 by way of the pipe 4 and the atomizing nozzle 5, and will meet a current of heated gases arising from the combustion of the residual materials by means of the air introduced by way of the pipe 13 which will become heated in its passage through the space intervening between the shells and will enter the inner shell by way of the openings 12 and pass through the grate 10 and the layer of refractory material 11 supported thereon, the products of the treatment being led away from the outlet 6.

When the apparatus is employed for distillation, the process will be normally carried out under atmospheric pressure and the distillation will correspond to that carried out in ordinary coking stills, the heat, however, being derived in the present process by the combustion of the coke within the chamber.

When cracking as well as distillation is desired, pressures of 50 to 500 lbs. may be maintained in the apparatus. Condensation of the light vapours produced will be relatively easily effected in such circumstances while when the treatment is carried out at atmospheric pressure special measures of a known character as, for instance, the absorption of the vapours in heavy oil or compression and cooling may be needed.

The temperatures will, of course, differ in different parts of the apparatus; immediately above the refractory material it will be that of the combustion of the residue thereon, and this temperature may be varied by regulating the air supply or by the introduction of steam or a gas. It may, for instance, be between 600 and 1200° C. at this point and it will be varied in accordance with the result it is desired to obtain in treating a given oil. From the layer of refractory material upward the temperature will decrease and the temperature at the gas and vapor outlet may, when the process is carried out to effect distillation, be that of the boiling point of the lower boiling fractions of the oil and be, for instance, between 200° and 400° C. When cracking is desired the temperatures may be kept between, say, 350° and 650° C.

A pyrometer of suitable construction may be employed for measuring the temperature at the top of the device and the admission of air and steam or inert gas, if used, may be regulated in accordance with the indications of the pyrometer.

The dimensions of the inner shell of the device may be varied according to requirements such as, for instance, the output and result desired.

For effecting the spraying or atomization of the material to be treated a device as, for instance, a pressure atomizer or steam injector adapted to convert the material into a sufficiently finely divided state and to distribute it sufficiently uniformly over the whole cross sectional area of the treatment chamber will be used.

Having now described my invention, what I claim as new and desire to secure by Letters Patent is:—

1. A process of distilling and cracking mineral oils and other hydrocarbon-containing materials, which consists in causing the material to be distilled or cracked to descend in a finely divided state through an unobstructed chamber in direct contact with a current of hot gas produced by the combustion of the less volatile residues obtained in the treatment of the material.

2. A process as claimed in claim 1 in which material treated is petroleum, which is introduced in the form of a spray in order to cause the same to expose a considerable surface to the heated gases at the upper portion of the treatment chamber, and in which moistened air is introduced at the lower portion of the chamber and is broken up and mixed with the heated gases.

3. A process for distilling and cracking hydrocarbon-containing materials which consists in causing the material to descend in a finely divided state through an unobstructed closed chamber in which a current of hot gas produced by the combustion of less volatile residues obtained in the treatment of the material rises and acts upon them finely divided.

In testimony whereof I have signed my name to this specification.

NORMAN VICTOR SYDNEY KNIBBS.